Oct. 22, 1929.  E. P. ADAM ET AL  1,732,827

SPARK PLUG

Filed Oct. 27, 1927

INVENTORS:
Edmond Pierre Adam
and René Louis Métailler
By
ATTORNEY

Patented Oct. 22, 1929

1,732,827

UNITED STATES PATENT OFFICE

EDMOND PIERRE ADAM AND RENÉ LOUIS METAILLER, OF PARIS, FRANCE

SPARK PLUG

Application filed October 27, 1927, Serial No. 229,130, and in France October 1, 1927.

This invention relates to improvements in spark plugs for internal combustion engines, and more particularly in the type of plug which is equipped with a protecting device for preventing fouling.

Plugs of the character indicated, as heretofore constructed, are usually open to the objection that they provide a space or chamber of substantial size between the electrodes and the interior of the cylinder, and in which ignition takes place; such space resulting in certain well-recognized defects, among which may be mentioned a heating action sufficiently intense to render the use of the protecting device impossible with modern high-compression engines. This heating, as will be understood, is due to infiltration of gas between the stem of the plug proper and the inner wall of the protector element. Other defects inherent to protected plugs now in use are defective ignition and, in some cases, impaired escape of burned gases from the ignition space.

The object of the present invention is to provide a protected spark plug in which the above-mentioned and other objectionable features are overcome or avoided; this being due primarily to the omission of the elongated ignition space or chamber referred to, and to the employment of a positive means for preventing gas-infiltration, all as hereinafter explained.

Figure 1:
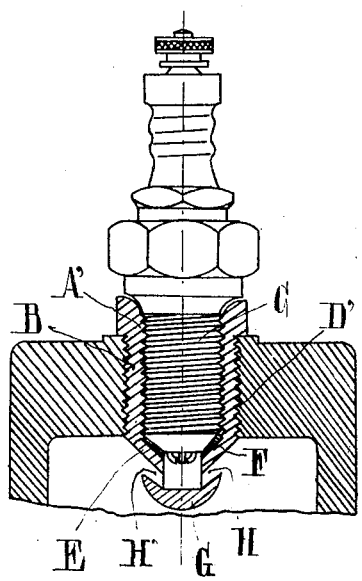
Figure 2:
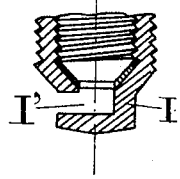

In the accompanying drawing, Figure 1 is a vertical sectional view of the improved spark plug, and Fig. 2 is a fragmental sectional view of a slightly modified form of protecting device.

As shown in said drawing, the protecting device consists of a sleeve-like member B, having external threads D' and internal threads A' and provided with a frusto-conical inner or lower end E. This sleeve B is designed to screw into the usual opening in the cylinder head; and the length of its threaded body portion is just equal to that of the cylinder opening, while its frusto-conical portion E projects downward or inward into the interior of the cylinder, its upper end being slightly enlarged and shouldered so as to rest on the outer face of the cylinder head. The aforesaid body portion, it will be observed, is of constant diameter both externally and internally, as distinguished from sleeves or tubes, the upper and lower portions of which are of appreciably different diameters.

The sleeve B above described is designed for use in connection with a spark plug proper which, while in the main of usual or conventional type, is provided with an externally-threaded stem C designed to screw into the sleeve and having a length such that its threads engage the internal sleeve threads A throughout the entire extent of the latter, while its inner or lower end has a frusto-conical shape which conforms precisely to the frusto-conical inner surface of the sleeve end E. To secure a perfectly tight joint at this point, and thereby avoid gas-infiltration completely, a deformable frusto-conical washer F, preferably made of very thin copper, is interposed between the two frusto-conical surfaces of the sleeve and plug end, so that it will be tightly compressed and clamped in place when the plug is screwed home. Consequently, the stem of the plug will occupy the entire interior of the sleeve, so that the usual space or chamber in the latter is completely done away with, while the gas-tight joint at the bottom of the device will prevent oil and gases from the cylinder from penetrating between the sleeve and stem, thereby avoiding one cause of heating and loss of power.

The improved sleeve B is completed by the provision, at its lower or inner end, of a cup-like member G of concavo-convex formation, having two oppositely-located, downwardly-slanting apertures H, H' to permit access of the compressed gaseous mixture to the electrodes. This member or cup is constructed integral with the sleeve, and the slanting disposition of its aforesaid apertures serves to prevent lateral projection of oil and products of combustion when ignition occurs; the said apertures being formed by means of a reamer or similar tool. Fig. 2 shows a slight modification of this feature which is intended primarily for horizontally-located spark plugs; and according to which the member or extension I at the inner end of the sleeve is provided with a single downwardly-extending aperture I' to permit oil drainage.

We claim as our invention:

1. A spark plug having an externally-threaded stem of substantial length provided at its inner end with a frusto-conical portion; and a protective sleeve threaded both externally and internally for substantially its entire length and adapted to be screwed into an opening in the head of an engine cylinder, said sleeve terminating at its inner end in a frusto-conical portion which conforms to the conicity of the first-named portion and which projects into the interior of the cylinder, the outer and inner diameters of the sleeve being constant throughout, and the plug stem conformably fitting in and occupying the entire interior of said sleeve; and firing points at the frusto-conical portion of said stem and disposed immediately below the frusto-conical portion of the sleeve.

2. A spark plug having an externally-threaded stem; a protective sleeve threaded both externally and internally and adapted to be screwed into an opening in the head of an engine cylinder, said sleeve projecting at its inner end into the interior of the cylinder; firing points at the inner end of the stem and disposed within the said cylinder; and means interposed between the said inner ends of the stem and sleeve to form a gas-tight joint.

In testimony whereof we affix our signatures.

EDMOND PIERRE ADAM.
RENÉ LOUIS METAILLER.